J. F. MULLER.
PIPE AND FITTING.
APPLICATION FILED APR. 3, 1911.

997,691.

Patented July 11, 1911.

WITNESSES

INVENTOR

UNITED STATES PATENT OFFICE.

JOHN FERRIS MULLER, OF NEW ORLEANS, LOUISIANA.

PIPE AND FITTING.

997,691.  Specification of Letters Patent.  Patented July 11, 1911.

Application filed April 3, 1911. Serial No. 618,579.

*To all whom it may concern:*

Be it known that I, JOHN F. MULLER, citizen of the United States, residing at New Orleans, in the parish of Orleans and State of Louisiana, have invented new and useful Improvements in Pipes and Fittings, of which the following is a specification.

My present invention has to do with pipes and fittings, and contemplates the provision of a metal band adapted to be applied to the hub of a pipe or fitting to prevent cracking thereof during handling and calking, and also adapted to be applied to a cracked hub for the purpose of precluding opening of the crack when the hub is tightly calked.

The invention will be best understood by reference to the following description when taken in connection with the accompanying illustration of one specific embodiment thereof, while its scope will be more particularly pointed out in the appended claim.

Figure 1:
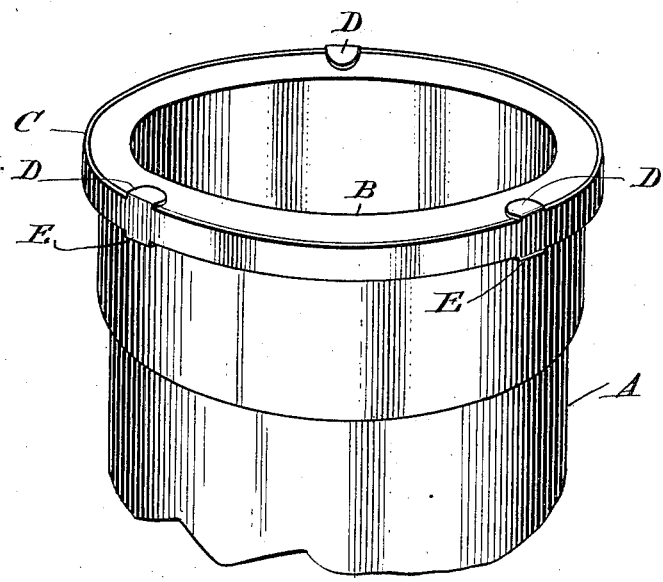
Figure 2:
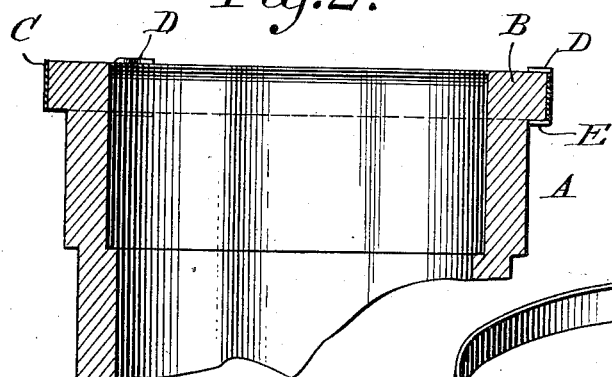
Figure 3:
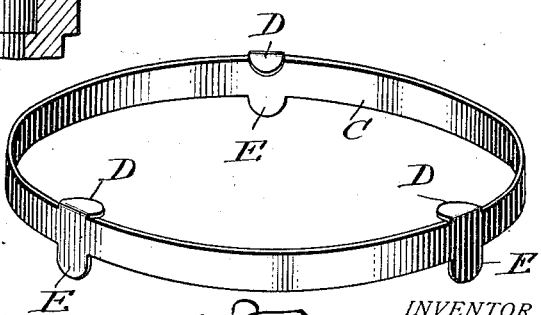

In the drawings which are hereby made a part hereof: Figure 1 is a perspective view showing a portion of a pipe and my novel reinforce and binding band properly applied thereto. Fig. 2 is a diametrical section of the same. Fig. 3 is a perspective illustrating the band as it appears precedent to being applied to the hub of a pipe or fitting.

Similar letters of reference designate corresponding parts in all of the views of the drawings.

The pipe A is provided with the usual hub B, and my novel band C, of suitable metal, is designed to surround and tightly inclose the hub with a view to lending increased strength and resistance capacity to the hub and preventing breaking or cracking thereof during handling and calking. The said band C may be applied while hot or may be driven on the hub while cold so as to snugly surround or closely confine the hub for the purpose stated.

At its outer edge the band C is provided with three (more or less) lugs D, turned inward to positions at right angles to the band, and at its inner edge the band has three (more or less) lugs E which, in the first instance, lie in the same plane as the band. Thus it will be understood that the band may be moved inward to a position on the hub, and then the lugs E may be bent tight against the inner side of the hub. With this done, the lugs D will effectually prevent inward movement of the band on the hub, and the lugs E will prevent outward movement of the band, notwithstanding the blows to which the band may be subjected during the calking operation.

From the foregoing it will be readily appreciated that the band may be expeditiously and easily applied to a hub, and then with equal facility the band may be secured on the hub by bending the lugs E inward, as shown in Fig. 2. It will also be understood that the band is calculated to prevent cracking of a hub during the handling or calking of a pipe or fitting, and is also calculated when applied to a cracked hub to prevent opening of the crack no matter how tightly the hub may be calked. This latter will be appreciated as an important advantage when it is considered that by the use of the inexpensive band a pipe or fitting having a cracked hub may be employed to practically the same advantage as a pipe or fitting the hub of which is sound and unbroken.

Obviously the band will be made of different widths and thicknesses to suit pipes or fittings of different sizes.

While I have shown and described one form of my invention, it is to be understood that I am not limited to such form but that modifications may be made within the scope of my invention as defined in the claim appended.

Having described my invention, what I claim and desire to secure by Letters-Patent, is:

The combination of a pipe having an integral hub, and a band surrounding and tightly inclosing the hub and having lugs laid inward at a right angle to its major portion and opposed to the inner side of the hub and also having inwardly extending lugs arranged parallel to and against the outer side of the said hub, whereby the band is held to the hub and against inward and outward movement on the same.

In testimony whereof I have hereunto set my hand in presence of two subscribing witnesses.

JOHN FERRIS MULLER.

Witnesses:
JNO. B. HUSS,
E. W. OLSCHNER.